US008239878B2

(12) United States Patent
Schneider

(10) Patent No.: US 8,239,878 B2
(45) Date of Patent: Aug. 7, 2012

(54) VERIFICATION OF LOADABLE OBJECTS

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 998 days.

(21) Appl. No.: 11/809,617

(22) Filed: May 31, 2007

(65) Prior Publication Data

US 2008/0301712 A1  Dec. 4, 2008

(51) Int. Cl.
*G06F 12/14* (2006.01)
(52) U.S. Cl. ......... 719/316; 713/187; 713/188; 713/189
(58) Field of Classification Search .............. 713/187; 717/166
See application file for complete search history.

(56) References Cited

U.S. PATENT DOCUMENTS

| | | | | |
|---|---|---|---|---|
| 3,931,504 | A * | 1/1976 | Jacoby | 726/23 |
| 6,694,434 | B1 * | 2/2004 | McGee et al. | 713/189 |
| 7,159,126 | B2 * | 1/2007 | Kang et al. | 713/193 |
| 7,272,830 | B2 * | 9/2007 | de Jong | 717/157 |
| 7,350,204 | B2 * | 3/2008 | Lambert et al. | 717/172 |
| 7,720,223 | B2 * | 5/2010 | Ezaki et al. | 380/201 |
| 2003/0177394 | A1 * | 9/2003 | Dozortsev | 713/201 |
| 2006/0059366 | A1 * | 3/2006 | Feinleib et al. | 713/187 |
| 2007/0250927 | A1 * | 10/2007 | Naik et al. | 726/22 |

OTHER PUBLICATIONS

"Using Software Restriction Policies to Protect Against Unauthorized Software," Jan. 1, 2002, 47 pages.*

* cited by examiner

*Primary Examiner* — H. S. Sough
*Assistant Examiner* — Kimberly Jordan
(74) *Attorney, Agent, or Firm* — Lowenstein Sandler PC

(57) ABSTRACT

A method and apparatus for verifying loadable objects. A request is received from an application to load a first loadable object into memory. A first signature value is calculated for the first loadable object. The first loadable object is loaded into memory if the first signature value matches one of a plurality of signature values, each of the plurality of signature values being associated with a distinct loadable object.

20 Claims, 6 Drawing Sheets

VERIFICATION OF LOADABLE OBJECTS

TECHNICAL FIELD

Embodiments of the present invention relate to loading data into memory, and more specifically to verifying loadable objects before loading them into memory.

BACKGROUND

Operating systems generally include loading functions that enable loadable objects (e.g., device drivers, programs, dynamic link libraries (dlls), etc.) to be loaded into memory. For example, the Windows® operating system includes a load library call that loads loadable objects into memory, and Unix systems include an exec call that loads loadable objects into memory. When one of these loading functions receives a request to load an object into memory, it checks the object to ensure that the object is loadable (e.g., that the structure of the object will support being loaded into memory). If the object is a loadable object, then the loading function loads it into memory.

Commercial on-access virus scanners are third party applications that scan loadable objects for known virus signatures before the loadable objects are loaded into memory. If a known virus signature is detected in a loadable object, that loadable object is not loaded into memory. However, on-access virus scanners do not prevent loadable objects from being loaded if the loadable object includes an unknown virus, if the loadable object has been modified, or if the loadable object has been corrupted.

BRIEF DESCRIPTION OF THE DRAWINGS

The present invention is illustrated by way of example, and not by way of limitation, in the figures of the accompanying drawings and in which.

DETAILED DESCRIPTION

Figure 1A:
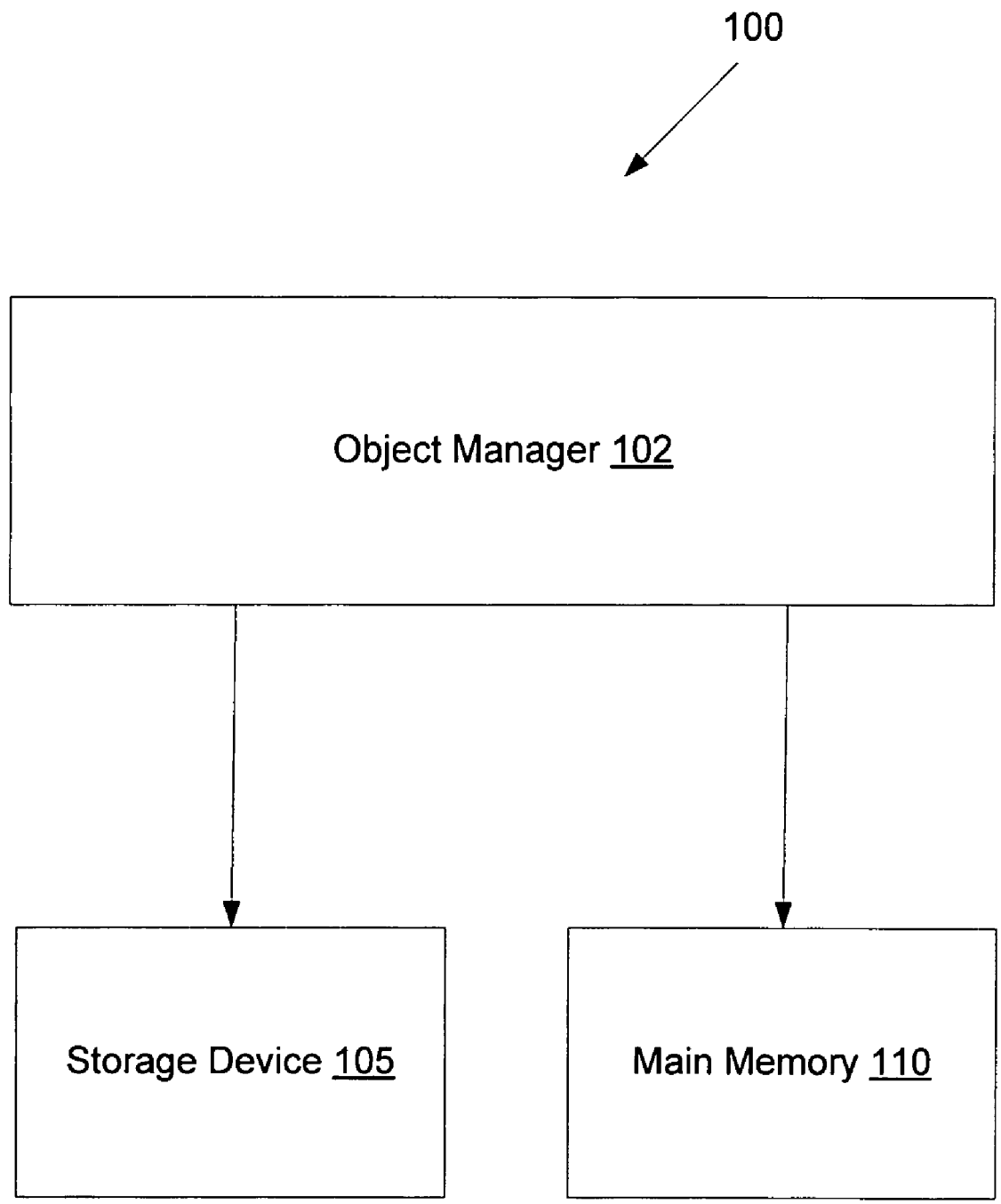
FIG. 1A illustrates an object loading system, in accordance with one embodiment of the present invention.

Described herein is a method and apparatus for verifying loadable objects. In one embodiment, a request is received from an application to load a first loadable object into memory. A signature value is calculated for the first loadable object. The signature value may be a cyclic redundancy check, a checksum, a cryptographic hash, etc. of the first loadable object. The signature value of the first loadable object is compared to one or more pre-existing signature values associated with distinct loadable objects. If the signature value of the first loadable object matches one of the pre-existing signature values, the first loadable object is loaded into memory. If the signature value of the first loadable object does not match one of the pre-existing signature values, a user may be notified that the first loadable object cannot be loaded.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "storing", "calculating", "generating", "loading" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

FIG. 1A illustrates an object loading system 100, in accordance with one embodiment of the present invention. The logic loading system 100 may reside on a computing device such as a personal computer (PC), a server, a cellular phone, a personal digital assistant (PDA), etc. In one embodiment, the object loading system 112 includes an object loader 102, a storage device 105, and a main memory 110. In one embodiment, each of the object manager 102, storage device 105 and main memory 110 reside on the same computing device. Alternatively, one or more of the object manager 102, storage device 105 and main memory 110 may reside on different computing devices.

Main memory 110 is memory that is directly accessible to a processor (not shown) of a computing device, and is used to store data that is likely to be in active use. Main memory 110 may include, read-only memory (ROM), flash memory, dynamic random access memory (DRAM) such as synchronous DRAM (SDRAM) or Rambus DRAM (RDRAM), etc.

Storage device 105 is memory that is not directly accessible to the processor of a computing device, and is used to store data that is not in active use. Storage device 105 may include a static memory (e.g., flash memory, static random access memory (SRAM), etc.), volatile memory (e.g., random access memory (RAM)), hard drive, optical drive, tape backup, etc. In one embodiment, the storage device 105 may be a secure storage device, or may have secure regions that store sensitive information. Sensitive information stored in secure storage may be accessible only to specified processes (e.g., to functions of an operating system), thereby preventing tampering.

In one embodiment, storage device 105 is a single device (e.g., a single hard drive). Alternatively, storage device 105 may include multiple devices of the same type (e.g., multiple hard drives) or of different types (e.g., a hard drive and a static memory). For example, the storage device 105 may include permanent storage and temporary storage. Some signature values may be stored in the temporary storage (e.g., if a loadable object is not registered, but has been temporarily approved for loading), while other signature values may be stored in the permanent storage (e.g., signature values of loadable objects that have been registered).

Object manager 102 manages one or more aspects of loading objects into main memory 110. In one embodiment, object manager 102 is a function of an operating system. Alternatively, object manager 102 may be a stand alone application, or a function of an application. In one embodiment, object manager 102 receives requests to load objects from storage device 105 into main memory 110, and verifies that the objects are loadable objects (e.g., that the structure of the object will support being loaded into memory) before loading them into main memory 110. In another embodiment, object manager 102 calculates a signature value for a loadable object before loading it into main memory 110. The calculated signature value may be compared to stored signature values of distinct loadable objects, and if a match is found, the loadable object may be loaded into main memory 110. If a match is not found, the loadable object may not be loaded into main memory 110.

Figure 1B:
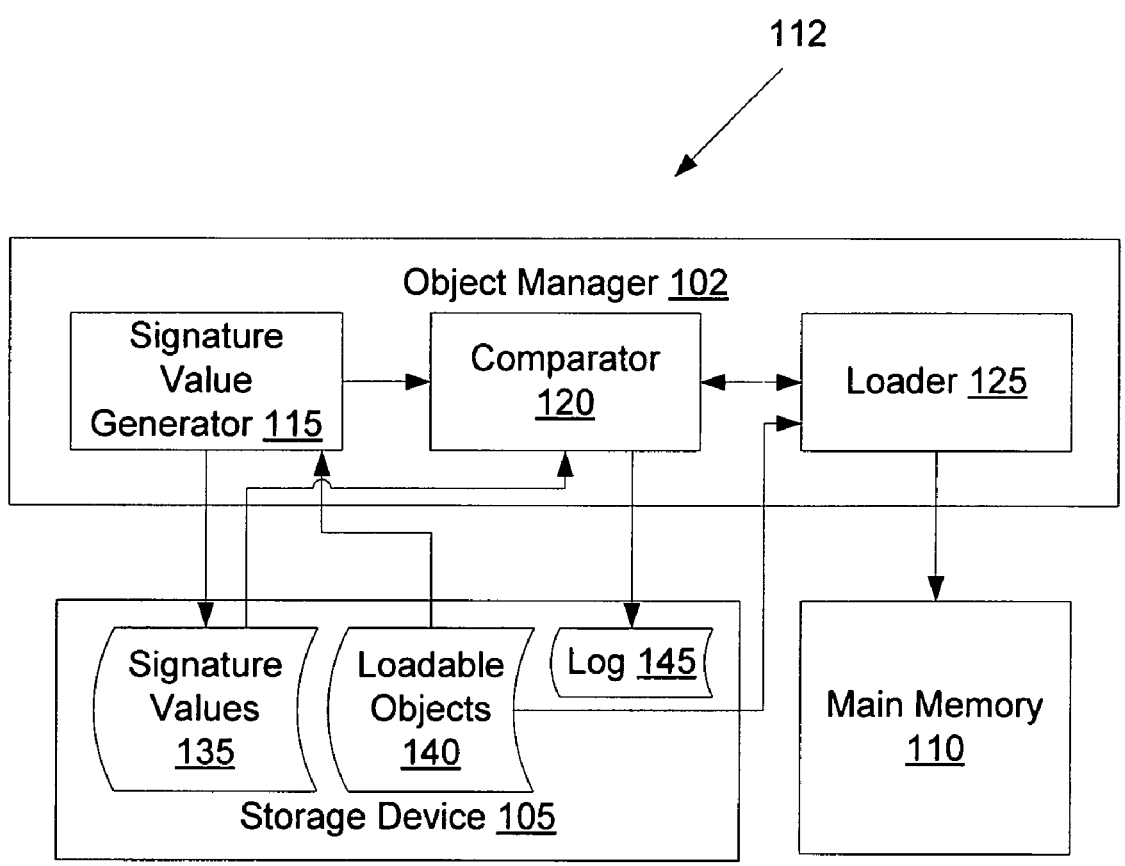
FIG. 1B illustrates an object loading system, in accordance with another embodiment of the present invention.

FIG. 1B illustrates an object loading system 112, in accordance with another embodiment of the present invention. In one embodiment, the object loading system includes an object manager 102, a storage device 105 and a main memory 110.

In one embodiment, the storage device 105 includes one or more loadable objects 140 and one or more signature values 135. In a further embodiment, the signature values 135 are stored in a secure storage device, or in secure portions of the storage device 105. In yet a further embodiment, storage device 115 includes a log 145 of loadable objects 140 that have failed to load. Alternatively, log 145 may be stored externally to computing device 100 (e.g., on a network server). Log 145 may be used, for example, to track problems, provide user support, and/or to track and report unauthorized access attempts.

A loadable object may be any type of data that can be loaded into main memory 110. Examples of loadable objects 140 include programs (e.g., an application or part of an operating system), dynamically linked libraries (dll), device drivers, etc. Once a loadable object is loaded into memory, instructions included in the loadable object can be processed, and data in the loadable object can be made available to other loadable objects 140.

Signature values 135 are digital fingerprints of loadable objects 140, wherein each signature value may uniquely identify one of the loadable objects 140. In one embodiment, the signature values 135 are generated by performing cyclic redundancy checks (an error detection mechanism in which a block of data is divided by some predefined polynomial to generate a remainder) on the loadable objects 140. In another embodiment, the signature values 135 are checksums (a numerical value calculated from the contents of a block of data) of the loadable objects 140. In yet another embodiment, the signature values 135 are generated by performing a cryptographic hash function (a function that takes an input of arbitrary length and generates a fixed length output from which it is difficult to deduce the input) on the loadable objects 140. Examples of cryptographic hash functions include SHA-1, SHA-256, MD5, RIPEMD-160, etc. In yet another embodiment, the signature values 135 are generated by producing a message authentication code (MAC) (a cryptographic hash that requires a secret key). Alternatively, the signature values 135 may be check digits, hamming code, etc.

In one embodiment, the object manager 102 includes a signature value generator 115, a comparator 120 and a loader 125. Alternatively, one or more of the signature value generator 115, comparator 120 and loader 125 may be part of a logic component that is separate from object manager 102.

Signature value generator 115 generates signature values 135 for loadable objects 140. Signature value generator 115 may perform one or more of a cryptographic hash function, a cyclic redundancy check, a checksum, etc., to generate signature values 135. In one embodiment, signature value generator 115 is a function of an operating system. Alternatively, signature value generator 115 may be a stand alone application, or a function of an application.

In one embodiment, signature value generator 115 includes a register subroutine that generates and stores signature values 135, and a compare subroutine that generates signature values and passes them on to comparator 120. Alternatively, the register subroutine and the compare subroutine may each be separate logic components. In one embodiment, the register subroutine is initiated on a user request to register one or more loadable objects 140. Alternatively, the register subroutine may be initiated when a new application is installed (e.g., by an administrator), after an operating system updates, etc. The register subroutine may be restricted such that it may only be successfully called by privileged users (e.g., a system administrator). Alternatively, any user may call the register subroutine.

When the register subroutine is initiated, the signature value generator 115 generates one or more signature values 135, and stores those signature values 135 in storage device 105. Each stored signature value may be associated with a registered loadable object. Thereby, so long as the loadable object is not modified, it may be loaded into main memory 110. Signature value generator 115 may generate signature values 135 for all loadable objects 140 upon a call to register all loadable objects 140. Alternatively, signature value generator 115 may generate signature values 135 for specified loadable objects 140 (e.g., a recently installed program or programs) upon a call to register those specified loadable objects 140.

In one embodiment, the compare subroutine of the signature value generator 115 is initiated when an application or other program attempts to load a loadable object into main memory 110 (e.g., by making a call to the loader 125). The compare subroutine may be initiated by the comparator 120, the loader 125, the application, or by some other program (e.g., a function of the standard library responsible for dynamically linking to dynamic libraries). In other embodiments, the compare subroutine may be initiated on a periodic basis, upon user request, etc., to determine whether any loadable objects 140 have been modified or new loadable objects 140 have been added. When the compare subroutine is initiated, the signature value generator 115 generates one or more current signature values for a specified loadable object or objects, and passes on the current signature value(s) to comparator 120.

Comparator 120 compares stored signature values 135 of registered loadable objects 140 to current signature values of loadable objects 140. In one embodiment, comparator 120 is a function of an operating system. Alternatively, comparator 120 may be a stand alone application, or a function of an application (e.g., a function of an application that includes signature value generator 115).

In one embodiment, when an application or other program attempts to load a loadable object by calling the loader 125, the comparator 120 intercepts the call, and makes a determination as to whether to pass on the call to the loader 125. In another embodiment, when the loader 125 receives a call, the loader 125 queries the comparator 120 to determine whether the loadable object should be loaded. In yet another embodiment, the comparator 120 periodically, or upon user request, determines which loadable objects have been modified or added since the loadable objects were registered.

To make a determination as to whether a loadable object should be loaded, or whether a loadable object is new or has been modified, comparator 120 receives the current signature value for that loadable object from the signature value generator 115 (e.g., after calling the signature value generator 115), and compares it to one or more stored signature values 135. In one embodiment, the comparator 120 compares the current signature value to multiple (e.g., all) stored signature values 140. Alternatively, comparator 120 may compare the current signature value only to a stored signature value that was generated for the same loadable object that was used to generate the current signature value. If the current signature value matches a stored signature value, this indicates that the registered loadable object from which the current signature value was generated has not been modified since it was registered. In one embodiment, when a match occurs, a call is passed on to loader 125 and/or the loader 125 is notified that a loadable object should be loaded. In another embodiment, when a match occurs, a message is generated that notifies a user that the loadable object has not been modified since it was registered.

If the current signature value does not match any of the stored signature values 135, then the loadable object may not be registered (e.g., the loadable object has been modified since it was registered, or it never was registered). In one embodiment, when no match occurs, the comparator 120 does not pass the loadable object on to the loader 125 and/or notifies the loader 125 that the loadable object should not be loaded. Alternatively, if no match occurs, the comparator 120 may pass the loadable object on to the loader 125 upon user confirmation to load the loadable object though no match occurred, and/or notify the loader 125 that the loadable object may be loaded upon user confirmation. When no match occurs, the comparator 120 may also generate a message to notify a user that the loadable object cannot be loaded and/or that the loadable object has been modified or was never registered. Comparator 120 may also generate the log 145 of loadable objects that have failed to load and/or add an entry to the log 145.

Loader 125 is a function of an operating system that loads loadable objects 140 into main memory 110. Examples of loaders include the load library call of the Windows® operating system, and the exec call of Unix operating systems. In one embodiment, when loader 125 is called to load a loadable object into main memory 110, it queries (e.g., calls) comparator 120 to determine whether the loadable object should be loaded. If the comparator 120 responds in the affirmative, then loader 125 may load the loadable object into main memory 110. If the comparator 120 responds in the negative, then the loader 125 may not load the loadable object into main memory 110. Thereby, unauthorized programs may be prevented from operating. For example, programs affected by viruses (even unknown viruses) may not load, and programs that have not been approved (e.g., by a network administrator) cannot be loaded. Moreover, hostile programs such as adware and spyware may be prevented from loading.

Figure 2A:
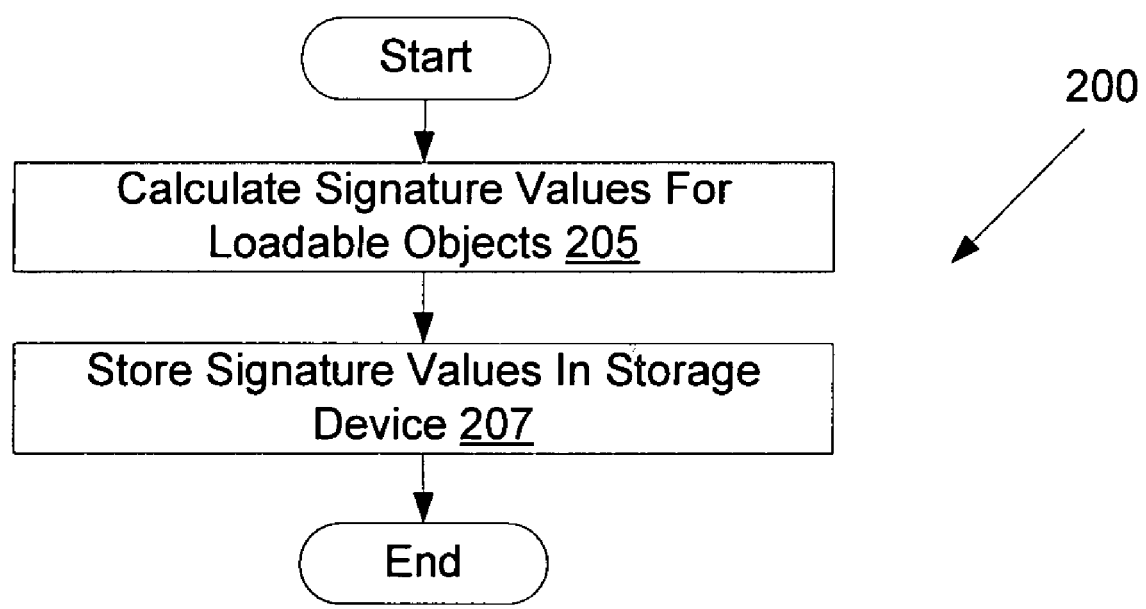
FIG. 2A illustrates a flow diagram of one embodiment for a method of registering loadable objects.

FIG. 2A illustrates a flow diagram of one embodiment for a method 200 of registering loadable objects. The method may be performed by processing logic that may comprise hardware (e.g., circuitry, dedicated logic, programmable logic, microcode, etc.), software (such as instructions run on a processing device), or a combination thereof. In one embodiment, method 200 is performed by the object loading system 100 of FIG. 1.

Referring to FIG. 2A, method 200 begins with calculating signature values for loadable objects (block 205). The signature values may be calculated by a signature value generator, and may be checksums, cryptographic hashes, cyclic redundancy checks, etc. Signature values may be generated for all loadable objects, or they may be generated for specified loadable objects (e.g., for recently installed programs).

At block 207, the signature values are stored in a storage device. In one embodiment, the storage device is a secure storage device. Alternatively, the signature values may be stored in a secure region of the storage device. The method then ends.

Figure 2B:
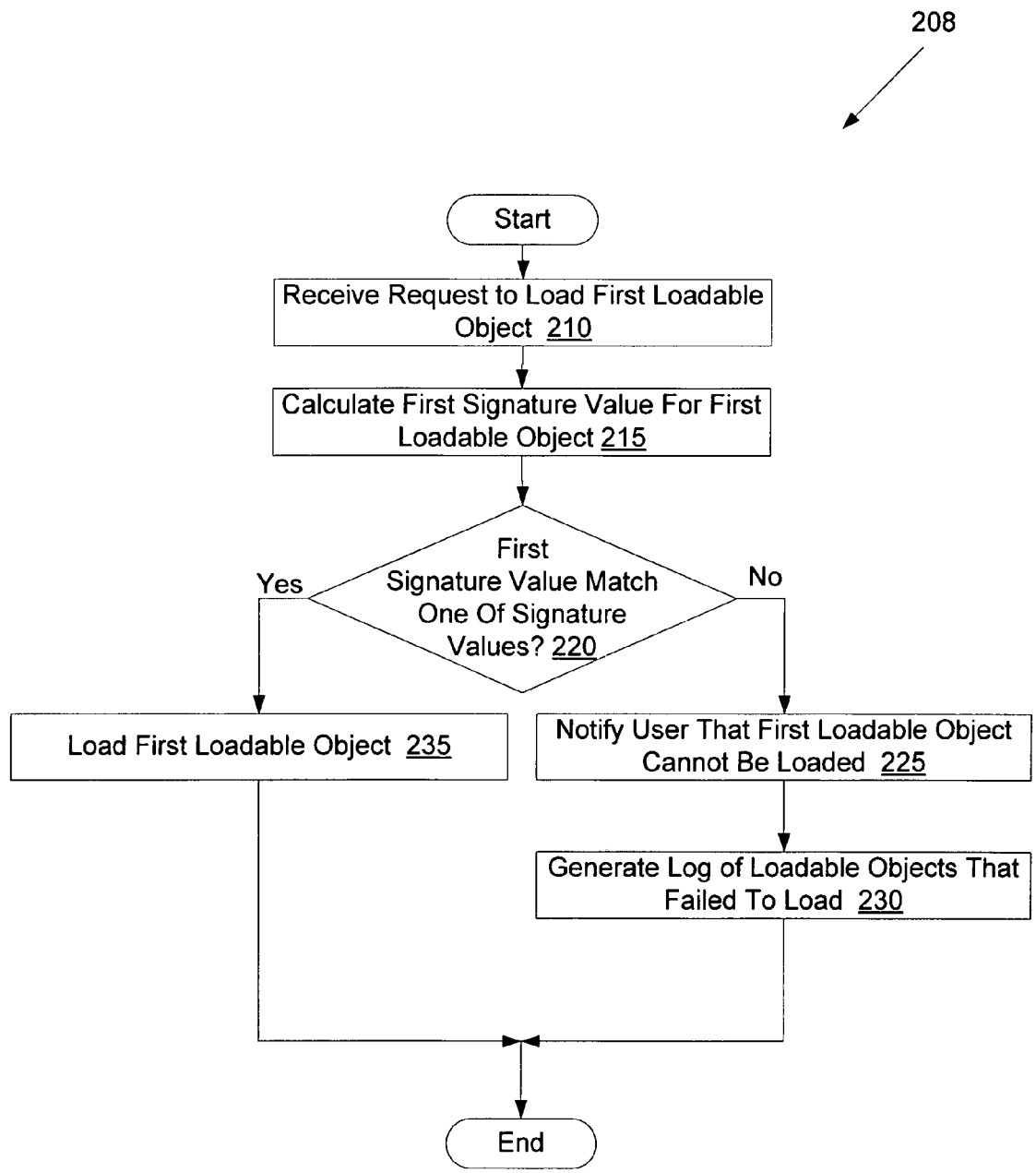
FIG. 2B illustrates a flow diagram of one embodiment for a method of verifying loadable objects.

FIG. 2B illustrates a flow diagram of one embodiment for a method 208 of verifying loadable objects. The method may be performed by processing logic that may comprise hardware (e.g., circuitry, dedicated logic, programmable logic, microcode, etc.), software (such as instructions run on a processing device), or a combination thereof. In one embodiment, method 200 is performed by the object loading system 100 of FIG. 1.

Referring to FIG. 2B, method 208 begins with processing logic receiving a request to load a first loadable object (block 210). The request may be received from an application or other program. At block 215, a first signature value is calculated for the first loadable object.

At block 220 processing logic determines whether the first signature value for the first loadable object matches one of the stored signature values. In one embodiment, the first signature value is compared to all stored signature values. Alternatively, the first signature value may be compared to fewer than all of the stored signature values. If the first signature value matches one of the stored signature values, the method proceeds to block 235. If the signature value does not match one of the signature values, the method proceeds to block 225.

At block 235, the first loadable object is loaded into memory.

At block 225, a user is notified that the first loadable object cannot be loaded. At block 230, a log of loadable objects that failed to load is generated. If such a log is already present, then an entry is added to the log. The method then ends.

Figure 2C:
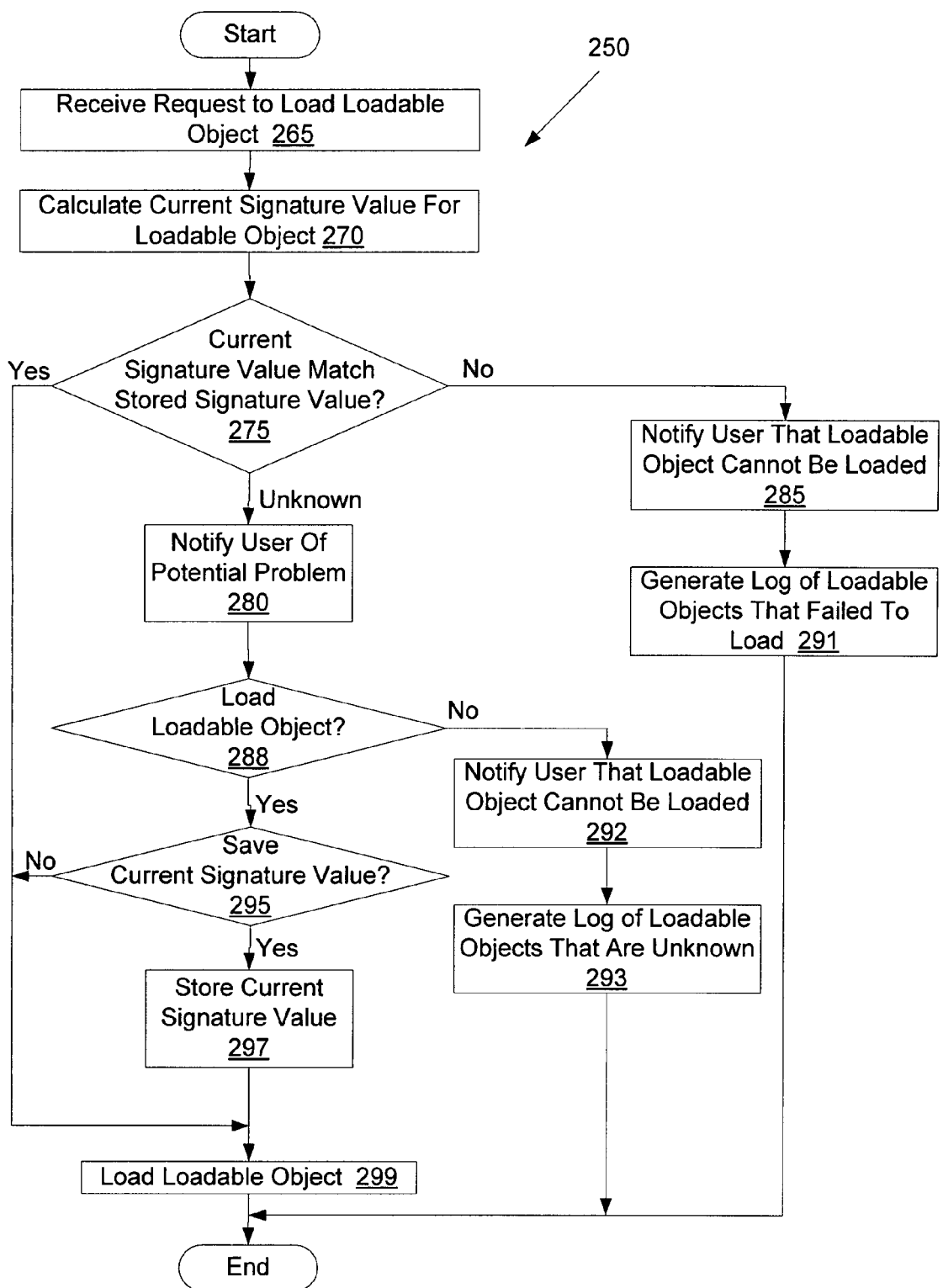
FIG. 2C illustrates a flow diagram of another embodiment for a method of verifying loadable objects.

FIG. 2C illustrates a flow diagram of another embodiment for a method 250 of verifying loadable objects. The method may be performed by processing logic that may comprise hardware (e.g., circuitry, dedicated logic, programmable logic, microcode, etc.), software (such as instructions run on a processing device), or a combination thereof. In one embodiment, method 250 is performed by object loading system 100 of FIG. 1.

Referring to FIG. 2C, method 250 begins with receiving a request to load a loadable object (block 265). The request may be received from an application or other program. At block 270, a current signature value is calculated for the loadable object.

At block 275 processing logic determines whether the current signature value for the loadable object matches a stored signature value for the loadable object. The stored signature value may have been generated upon a user request to register the loadable object. If the current signature value matches the stored signature value, the method proceeds to block 299. If the current signature value does not match the stored signature value, the method proceeds to block 285. If it can not be determined whether the current signature value matches the stored signature value, the method proceeds to block 280. Processing logic may not be able to determine whether the current signature value matches the stored signature value, for example, if no signature value was stored for the loadable object, if the stored signature value cannot be read, if the stored signature value has been deleted, etc. For example, some loadable objects are likely to change over their life. Signature values may not be stored for such loadable objects, since it is likely that a later calculated signature value would not match the stored signature value.

At block 285, the user is notified that the first loadable object cannot be loaded. At block 291, a log of loadable objects that failed to load is generated. If such a log is already present, then an entry is added to the log. The method then ends.

At block 280, a user is notified that it could not be determined whether the current signature value matches a stored signature value, thus indicating that it is unknown whether the loadable object has been modified. The method then proceeds to block 288. At block 288, processing logic determines whether the loadable object should be loaded. In one embodiment, processing logic automatically determines whether the loadable object should load based on a specified user preference. For example, processing logic may be configured to automatically load unknown loadable objects, or to automatically reject unknown loadable objects. In another embodiment, whether the loadable object should be loaded is determined based on user input (e.g., a user response to the notification provided by block 280). If the loadable object should be loaded, the method proceeds to block 295. If the loadable object should not be loaded, the method proceeds to block 292.

At block 292, the user is notified that the first loadable object cannot be loaded. At block 293, a log of loadable objects that are unknown is generated. If such a log is already present, then an entry is added to the log. The method then ends.

At block 295, processing logic determines whether the current signature value should be saved. In one embodiment, user input indicates whether the current signature value should be saved. For example, a user may select an option to save and register the loadable object. Alternatively, the user may choose to temporarily save the loadable object without registering it. In another embodiment, the decision of whether to save the current signature value is made automatically without user input. Such a determination may be made based on properties of the loadable object, specified preferences, etc. If the current signature value should be saved, the method continues to block 297. If the current signature value should not be saved, the method continues to block 299.

At block 297, the current signature value is stored. In one embodiment, the current signature value is stored in permanent storage such that future attempts to load the loadable object will be successful. Alternatively, the current signature value may be stored in temporary storage such that attempts to load the loadable object during a current session will be successful, but attempts to load the loadable object in subsequent sessions may be unsuccessful.

At block 299 the loadable object is loaded into memory. The method then ends.

Figure 3:
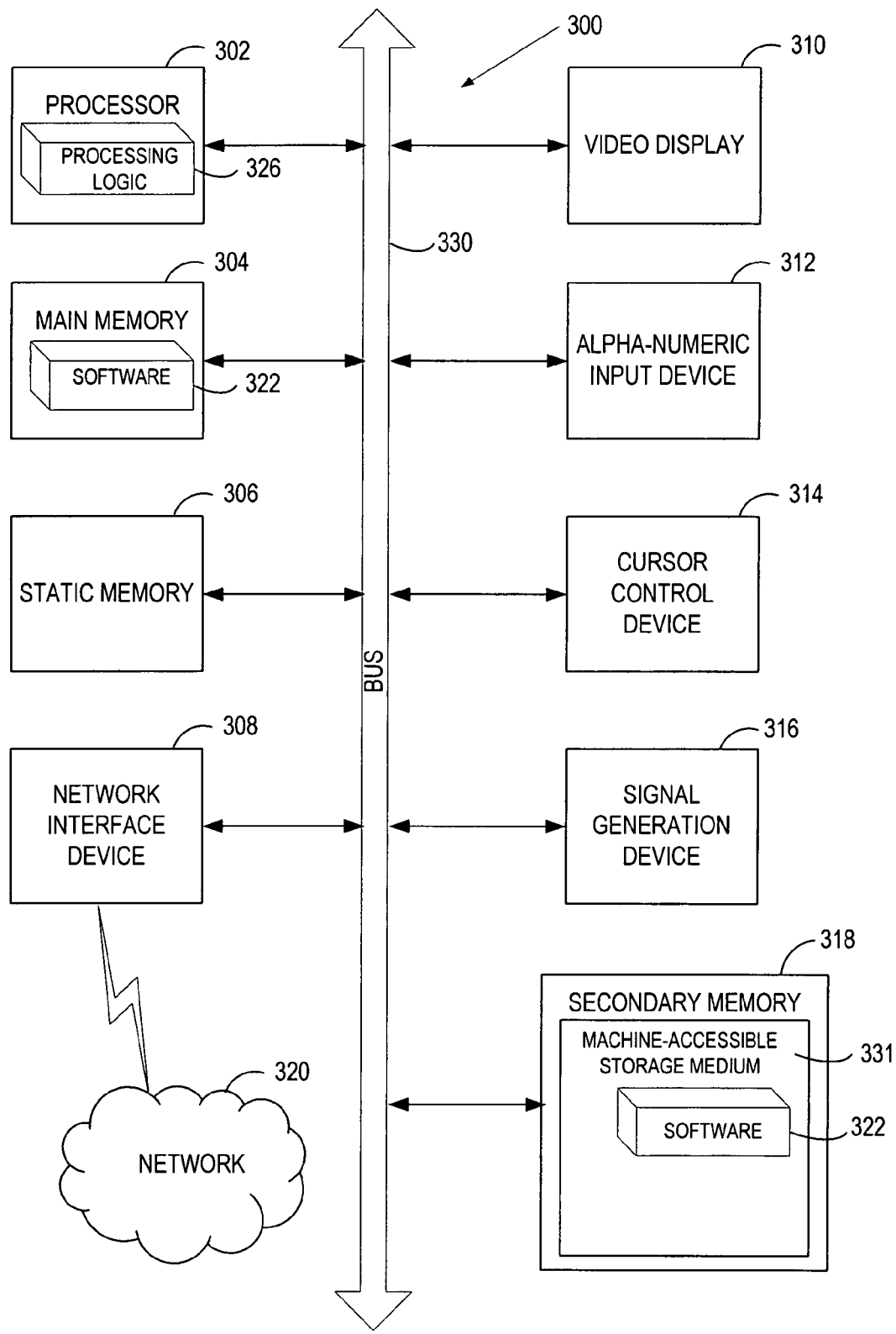
FIG. 3 illustrates a block diagram of an exemplary computer system, in accordance with one embodiment of the present invention.

FIG. 3 illustrates a diagrammatic representation of a machine in the exemplary form of a computer system 300 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processing device (processor) 302, a main memory 304 (e.g., read-only memory (ROM), flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a data storage device 318, which communicate with each other via a bus 330.

Processor 302 represents one or more general-purpose processing devices such as a microprocessor, central processing unit, or the like. More particularly, the processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 302 may also be one or more special-purpose processing devices such as an application specific integrated circuit (ASIC), a field programmable gate array (FPGA), a digital signal processor (DSP), network processor, or the like. The processor 302 is configured to execute the processing logic 326 for performing the operations and steps discussed herein.

The computer system 300 may further include a network interface device 308. The computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 316 (e.g., a speaker).

The data storage device 318 may include a machine-accessible storage medium 331 on which is stored one or more sets of instructions (e.g., software 322) embodying any one or more of the methodologies or functions described herein. The software 322 may also reside, completely or at least partially, within the main memory 304 and/or within the processor 302 during execution thereof by the computer system 300, the main memory 304 and the processor 302 also constituting machine-accessible storage media. The software 322 may further be transmitted or received over a network 320 via the network interface device 308.

The machine-accessible storage medium 331 may also be used to store data structure sets that define user identifying states and user preferences that define user profiles. Data structure sets and user profiles may also be stored in other sections of computer system 300, such as static memory 306.

While the machine-accessible storage medium 331 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
    receiving, by a processing device executing an object manager, a request from an application to load a loadable object into memory;
    if there is an existing signature value for the loadable object in a permanent storage, performing the following by the processing device:
        calculating a new signature value for the loadable object; and
        loading the loadable object into memory if the new signature value matches the existing signature value for the loadable object;
    if there is no existing signature value for the loadable object in the permanent storage, performing the following by the processing device, wherein there is no existing signature value for the loadable object if the loadable object changes over a lifetime of the loadable object:
        determining whether to load the loadable object into memory based on at least one of a specified user preference or a user input; and
        when it is determined to load the loadable object into memory, calculating a temporary signature value for the loadable object and storing the temporary signature value in a temporary storage, wherein no copies of the temporary signature value are stored in the permanent storage or in an additional permanent storage.

2. The method of claim 1, wherein the new signature value matches the existing signature value if the loadable object has not been modified since the existing signature value was generated.

3. The method of claim 1, further comprising:
    if the new signature value does not match the existing signature value, notifying a user that the loadable object cannot be loaded.

4. The method of claim 3, further comprising:
    generating a log of loadable objects that failed to load.

5. The method of claim 1, wherein the loadable object is at least one of a program, an application dynamic link library (dll), and a device driver.

6. The method of claim 1, further comprising:
    automatically calculating the existing signature value when the loadable object is initially installed unless it is known that the loadable object will change over the lifetime of the loadable object.

7. The method of claim 1, further comprising:
    storing the existing signature value in a secure location of the permanent storage.

8. The method of claim 1, wherein each of the existing signature value and the new signature value is one of a cyclic redundancy check, a checksum, and a cryptographic hash of the loadable object.

9. A non-transitory machine-accessible storage medium including instructions for an object manager that, when executed by a machine, cause the machine to perform a method, comprising:
    receiving, by the machine, a request from an application to load a loadable object into memory;
    if there is an existing signature value for the loadable object in a permanent storage, performing the following:
        calculating a new signature value for the loadable object; and
        loading the loadable object into memory if the new signature value matches the existing signature value for the loadable object;
    if there is no existing signature value for the loadable object in the permanent storage, performing the following, wherein there is no existing signature value for the loadable object if the loadable object changes over a lifetime of the loadable object:
        determining whether to load the loadable object into memory based on at least one of a specified user preference or a user input; and
        when it is determined to load the loadable object into memory, calculating a temporary signature value for the loadable object and storing a temporary signature value in the temporary storage, wherein no copies of the temporary signature value are stored in the permanent storage or in an additional permanent storage.

10. The machine-accessible storage medium of claim 9, wherein the new signature value matches the existing signature value if the loadable object has not been modified since the existing signature value was generated.

11. The machine-accessible storage medium of claim 9, the method further comprising:
if the new signature value does not match the existing signature value, notifying a user that the loadable object cannot be loaded.

12. The machine-accessible storage medium of claim 11, the method further comprising:
generating a log of loadable objects that failed to load.

13. The machine-accessible storage medium of claim 9, wherein the loadable object is at least one of a program, an application dynamic link library (dll), and a device driver.

14. The machine-accessible storage medium of claim 9, the method further comprising:
storing the existing signature value in a secure location of the permanent storage.

15. A computing apparatus comprising:
a memory;
instructions for an object manager stored in the memory; and
a processing device, connected with the memory, configured to execute the instructions, wherein the instructions cause the processing device:
to receive a request from an application to load a loadable object into memory;
if there is an existing signature value for the loadable object in a permanent storage, to perform the following:
calculate a new signature value for the loadable object; and
load the loadable object into memory if the new signature value matches the existing signature value for the loadable object; and
if there is no existing signature value for the loadable object in the permanent storage, to perform the following, wherein there is no existing signature value for the loadable object if the loadable object changes over a lifetime of the loadable object:
determine whether to load the loadable object into memory based on at least one of a specified user preference or a user input; and
when it is determined to load the loadable object into memory, calculate a temporary signature value for the loadable object and store the temporary signature value in a temporary storage, wherein no copies of the temporary signature value are stored in the permanent storage or in an additional permanent storage.

16. The computing apparatus of claim 15, wherein the new signature value matches the existing signature value if the loadable object has not been modified since the existing signature value was generated.

17. The computing apparatus of claim 15, wherein the instructions further cause the processor to notify a user that the loadable object cannot be loaded if the new signature value does not match the existing signature value.

18. The computing apparatus of claim 15, wherein the instructions further to cause the processor to generate a log of loadable objects that failed to load.

19. The computing apparatus of claim 15, wherein the loadable object is at least one of a program, an application dynamic link library (dll), and a device driver.

20. The computing apparatus of claim 15, wherein the instructions further to cause the processor to automatically calculate the existing signature value when the loadable object is initially installed unless it is known that the loadable object will change over the lifetime of the loadable object.

* * * * *